United States Patent [19]

Azuma et al.

[11] Patent Number: 4,809,096

[45] Date of Patent: Feb. 28, 1989

[54] TRACKING CONTROLLING DEVICE USING MULTIPLE PILOT SIGNALS IN MAGNETIC VIDEO SIGNAL RECORDING AND REPRODUCING APPARATUS

[75] Inventors: Nobuo Azuma; Hikaru Masui, both of Yokohama; Yoshizumi Watatani, Fujisawa, all of Japan

[73] Assignee: Hitachi, Ltd., Tokyo, Japan

[21] Appl. No.: 6,121

[22] Filed: Jan. 23, 1987

[30] Foreign Application Priority Data

Jan. 24, 1986 [JP] Japan .................................. 61-13175

[51] Int. Cl.⁴ ..................... G11B 15/467; G11B 5/588
[52] U.S. Cl. .................................................. 360/77.15
[58] Field of Search ............................................ 360/77

[56] References Cited

U.S. PATENT DOCUMENTS

| | | | |
|---|---|---|---|
| 4,510,533 | 4/1985 | Tokuyama | 360/77 |
| 4,573,089 | 2/1986 | Maeda et al. | 360/77 |
| 4,636,874 | 1/1987 | Hoogendooru et al. | 360/77 |
| 4,636,882 | 1/1987 | Edakubo et al. | 360/77 |
| 4,686,589 | 8/1987 | Takimoto | 360/77 |

FOREIGN PATENT DOCUMENTS 0089816 9/1983 European Pat. Off. ............. 360/77
2530482 1/1976 Fed. Rep. of Germany .

Primary Examiner—Alan Faber
Assistant Examiner—David L. Robertson
Attorney, Agent, or Firm—Antonelli, Terry & Wands

[57] ABSTRACT

A tracking controlling device is provided which is suitable for a rotating head helical scanning-type magnetic video signal recording and reproducing apparatus in which pilot signals of a plurality of frequencies are recorded in advance on tracks on a magnetic tape such as to be superimposed on video signals, and the pilot signals are reproduced during reproduction so as to effect tracking control. This tracking controlling device comprises means for separating and detecting two reproducing pilot signals from both tracks adjacent to the track being scanned by the rotating head, a comparator for comparing the magnitude of the reproducing pilot signals from the adjacent tracks and for generating a binary PWM signal in accordance with the magnitude, and controlling means for controlling the rotation of a capstan motor for driving the magnetic tape using the tracking error signal converted into the form of the PWM signal obtained by the output of the comparator. The tracking error signal converted to the PWM signal is capable of directly switching over and controlling the driving circuit for the capstan motor.

7 Claims, 6 Drawing Sheets $f_1 = 6.5 f_H$  $f_2 = 7.5 f_H$
$f_3 = 10.5 f_H$  $f_4 = 9.5 f_H$ FIG. 4a SW30 

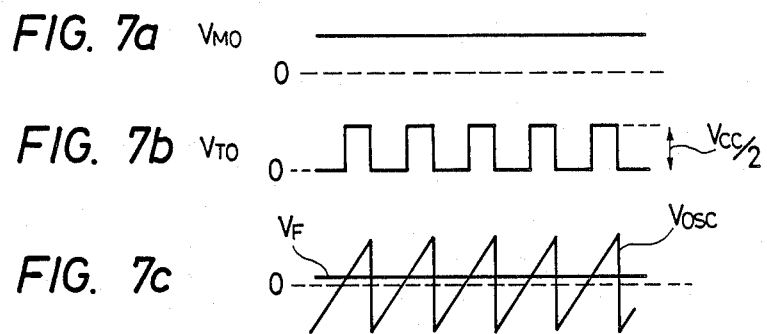
FIG. 7a  $V_{MO}$
FIG. 7b  $V_{TO}$
FIG. 7c
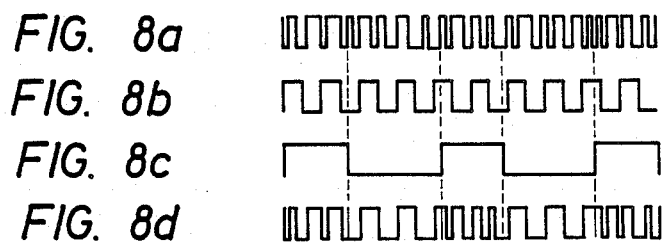
FIG. 8a
FIG. 8b
FIG. 8c
FIG. 8d

4,809,096

TRACKING CONTROLLING DEVICE USING MULTIPLE PILOT SIGNALS IN MAGNETIC VIDEO SIGNAL RECORDING AND REPRODUCING APPARATUS

BACKGROUND OF THE INVENTION

The present invention relates to a rotating head helical scanning-type magnetic recording and reproducing apparatus, and, more particularly, to a magnetic recording and reproducing apparatus for video signals in which tracking control is effected using pilot signals.

In a rotating head helical scanning-type video signal recording and reproducing apparatus, typical of which is a household-use video cassette recorder (VCR), a certain synchronizing signal, apart from the video information, is recorded on a magnetic tape during recording so as to effect tracking control. During reproduction, the control of the rotational phase of a capstan or the rotating head is effected by making use of the reproduced synchronizing signal, and tracking control is effected by a servo circuit so that the rotating head will correctly trace the video signal recording tracks of the magnetic tape.

As for the synchronizing signal, a pulse signal which is generally called a control signal and has a ½ cycle of the vertical synchronizing signal is used, and a system whereby this control signal is used after it is written at one edge of the tape by a fixed recording and reproducing head has been employed. However, since the position at which the control signal is recorded in accordance with this system and the video track are distanced from each other, if reproduction is carried out using an apparatus different from the one employed in recording, or due to change with age even if recording and reproduction are carried out by the same apparatus, there are cases where a tracking error occurs. For this reason, there has been a problem in that it becomes necessary to provide a manual tracking adjustment means.

Consequently, in recent years, a servo tracking system (called the pilot system for short) has been devised in which four kinds of pilot signals $f_1$, $f_2$, $f_3$, and $f_4$ having different frequencies are recorded on the video track as synchronizing signals in a superimposed manner to enable automatic tracking.

As an example of such a system, there is one disclosed in U.S. Pat. No. 4,297,733. In this system, four kinds of pilot signals of $f_1$ (6.5 $f_H$), $f_2$(7.5 $f_H$), $f_3$(10.5 $f_H$), and $f_4$(9.5 f) (where $f_H$ is the horizontal synchronization frequency) are in that order written in tracks for each field, and, during reproduction, not only the pilot signal in the scanning track of the rotating head, but also those in both adjacent tracks are read simultaneously. A differential signal of pilot signals in both adjacent tracks is produced as an analog signal using a differential amplifier, and a tracking error signal is produced on the basis of this differential signal, thereby effecting tracking control of the magnetic tape.

This pilot system permits an automatic tracking function, but since the tracking control is effected on the basis of the magnitude of the differential signal, there have been the following drawbacks:

(1) A tracking error occurs owing to the drift of constants and characteristics of components in the servo circuit caused by temperature change and the like, thereby causing a deterioration in the signal-to-noise ratio of pictures.

(2) If the loop gain of the servo system undergoes a major change due to the reproduction level of reproducing pilot signals with a resultant decline in the reproduction level, there is the possibility of the stability of the system becoming deteriorated, thereby resulting in the misengagement of the servo system and the like.

In particular, in cases where the track width is narrowed to enhance the recording density of signals and in the case of a magnetic recording and reproducing apparatus having two kinds of recording tape speeds of SP (standard play) mode and LP (long play) mode (e.g., the tape speed of LP is one half that of SP), since the reproducing pilot level declines substantially, the problem caused by fluctuations in the reproducing pilot level in the aforementioned drawback (2) has been large.

SUMMARY OF THE INVENTION

Accordingly, an object of the present invention is to provide a magnetic recording and reproducing apparatus having a tracking controlling device which prevents tracking errors and instability in the servo operation even if fluctuations occur in circuit constants and in the level of reproducing pilot signals.

To this end, the present invention is characterized in that reproducing pilot signals are separated and detected from both tracks adjacent to the track being scanned by a rotating head, a tracking error signal converted into the form of a pulse width modulation (PWM) signal is produced using a comparator comparing the magnitude of the two reproducing pilot signals detected from the adjacent tracks, and tracking control is effected by means of this signal, and that a capstan motor is switched over and driven by means of this tracking error signal by making use of the fact that a tracking error is expressed by PWM.

According to the characteristics of the present invention, when the trace by the head during reproduction is close to the center of tracking, the sensitivity of detecting the tracking error signal becomes particularly large, so that tracking control is not subjected to the effect of fluctuations in the constant of the servo circuit and in the level of the reproducing pilot signal, and stable tracking operations can be obtained. In addition, since the capstan motor for tape traveling can be switched over and driven directly by means of the tracking error signal in the form of the PWM signal, the arrangement of the servo circuit can be made simple.

BRIEF DESCRIPTION OF THE DRAWINGS

FIGS. 4a to 4d are diagrams illustrating waveforms of some signals in a circuit shown in FIG. 1 to explain operation;

FIGS. 7a to 7c are diagrams illustrating waveforms of some signals to explain the operation of the embodiment shown in FIG. 6;

FIGS. 8a to 8d are diagrams similarly illustrating waveforms of some signals in the circuit shown in FIG. 6.

DETAILED DESCRIPTION OF THE PREFERRED EMBODIMENTS

Figure 1:
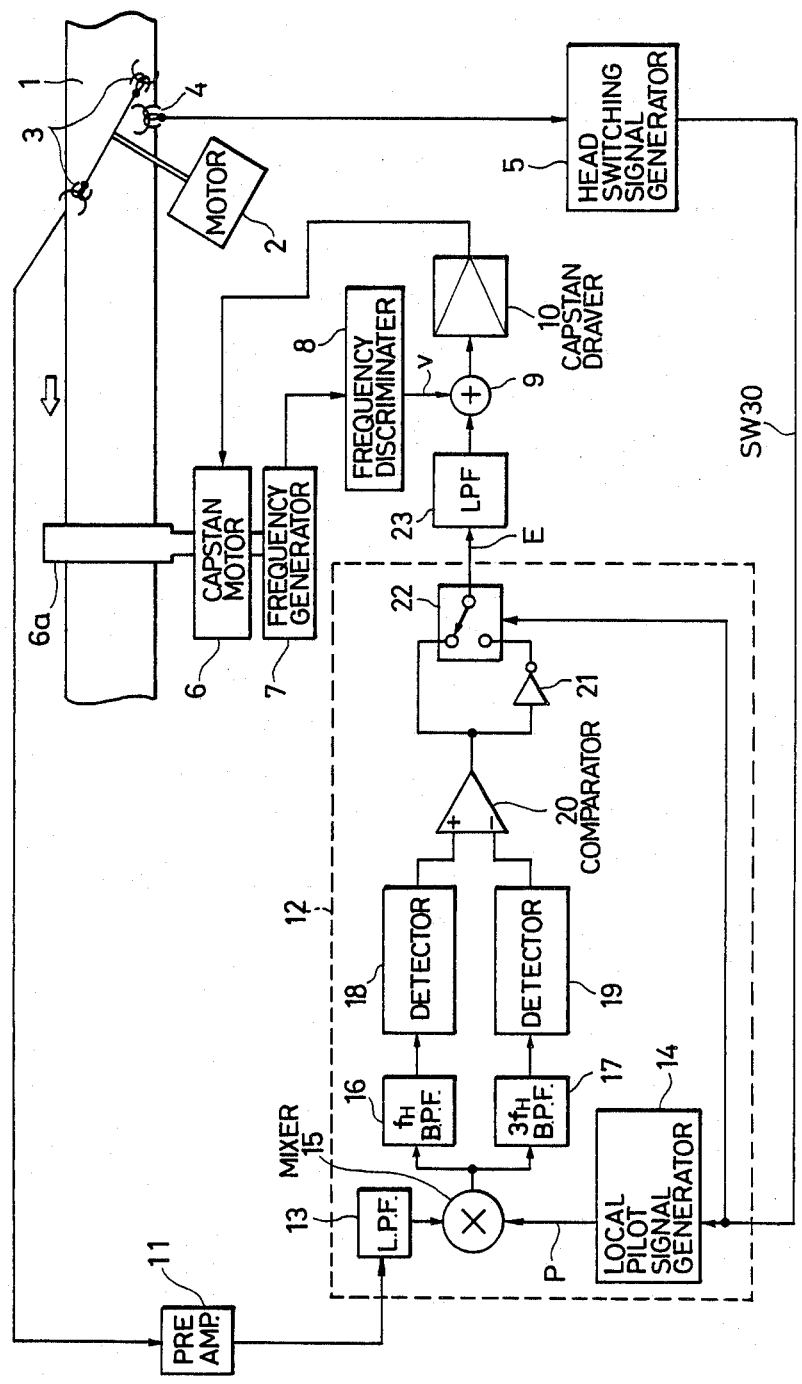
FIG. 1 is a block diagram of one embodiment of a tracking controlling device in accordance with the present invention.

FIG. 1 is a block diagram of a magnetic recording and reproducing apparatus in accordance with one embodiment of the present invention.

In FIG. 1, a magnetic tape 1 travels at a constant speed, for instance, in the direction of the arrow by means of a capstan 6a rotated by a capstan motor 6 in a known manner. A rotating video head 3 effects recording and reproducing of video signals by a circuit (not shown) in a known manner. At the same time, recording and reproducing of pilot signals for effecting tracking control, which relates to the characteristic of the present invention, is also carried out. When, video signals of, for example, the NTSC system are recorded and reproduced, this rotating video head 3 is driven by a motor 2 such as to make 30 revolutions per second. As for the rotational drive of this motor 2, the number of revolutions and the phase are controlled by a servo circuit (not shown). FIG. 1 is a block diagram illustrating portions of circuits related to tracking control during reproduction. Description will be made hereinafter of the operation of the embodiment shown in FIG. 1 with reference to FIG. 2 which is an explanatory diagram of a recording pattern on the magnetic tape, FIG. 3 which illustrates error signal detection characteristics, and FIGS. 4a to 4d which are signal waveform diagrams.

Figure 2:
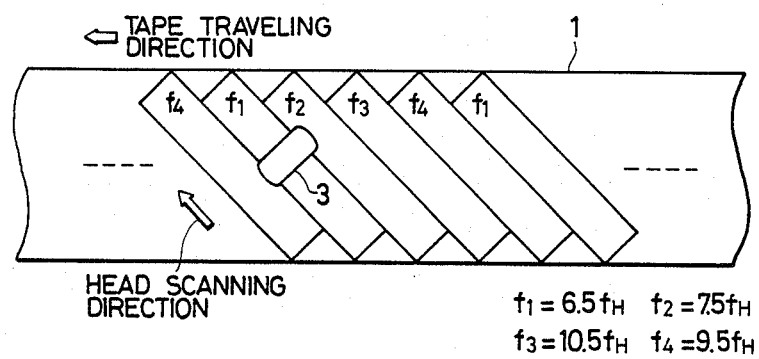
FIG. 2 is a pattern diagram schematically illustrating the state of recording pilot signals.

In FIG. 2, slanting rectangles in which $f_4$, $f_1$, $f_2$, $f_3$, $f_4$, and $f_1$ are written indicate tracks in which pilot signals have been recorded in advance. (Naturally, video signals have also been recorded.) The drawing shows a state in which the video head 3 is scanning the track in which the pilot signal of the frequency $f_1$ has been recorded, in the direction of the arrow.

The frequencies $f_1$ to $f_4$ are selected in such a manner that differences between the frequency of the track being scanned by the video head 3 and those of both adjacent tracks become $f_H$ and $3f_H$, and the arrangement is such that a tracking error can be detected by comparing an amount of cross talk from the adjacent tracks during reproduction.

In other words, in FIG. 1, after picking up a low-frequency reproducing pilot signal by a low-pass filter (LPF) from a reproducing signal read by the rotating video head 3 and amplified by a preamplifier 11, frequency conversion is effected by multiplying by means of a mixer 15 the reproducing pilot signal by a local pilot signal P from a local pilot signal generator 14, which has the same frequency as that of the pilot signal of the track to be scanned (the $f_1$ track in FIG. 2). The local pilot signal generator 14 generates four kinds of pilot signal by changing over the same consecutively for each field (i.e., for each track) in the same way as recording. The output signal of a head switching signal generator 5, which is generated in synchronization with the rotational phase of the rotating head 3, is utilized for the switching for each field. The head switching signal generator 5 generates a pulse signal having a duty ration of 50% when it is triggered by a pulse obtained for each revolution by a rotation detecting head (hereafter referred to as the "tach. head") for detecting the rotational phase of the rotating video head. (In an apparatus handling NTSC signals, the repeated frequency becomes 30 Hz. This head switching signal shall be referred to as the "SW30 signal" hereafter.) If the four kinds of pilot signals of frequencies $f_1$, $f_2$, $f_3$, and $f_4$ are set to 6.5 $f_H$, 7.5 $f_H$, 10.5 $f_H$, and 9.5 $f_H$, respectively, by assuming the horizontal scanning frequency to be $f_H$, as shown in FIG. 2, the mixer 15 multiplies the pilot signal reproduced from the target track being traced by the video head 3 by the output of the local pilot signal generator 14, and, at the same time, the pilot signals simultaneously reproduced for the tracks adjacent to this track are also multiplied by the local pilot signal. Consequently, signals each having the frequencies of 1 $f_H$ and 3 $f_H$ are generated by the adjacent pilot signals. Hence, these two signals are extracted by a $f_H$ band-pass filter (hereafter referred to as the "$f_H$BPF") and a 3 $f_H$ band-pass filter (hereafter referred to as the "3 $f_H$BPF"), and are detected by detectors 18, 19, respectively, with the result that two error signals, an $f_H$ error signal and a 3 $f_H$ error signal, can be obtained. Subsequently, by comparing the magnitude of the $f_H$ error signal and the 3 $f_H$ error signal by means of a comparator 20, information on the direction of the tracking error relative to the state of just tracking can be obtained.

However, if the rotating head 3 deviates to the upper right in FIG. 2 during the scanning of the track $f_1$, the output of this comparator 20 becomes "H" (i.e., the error for $f_H$ increases), and if it deviates to the upper right during the scanning of the track $f_2$, the output of the comparator 20 becomes "L". In other words, even if deviation occurs in the same direction for each track, the polarity reverses depending on which of the tracks $f_1$ to $f_4$ is being scanned.

For this reason, the output of the comparator 20 and a signal whose phase has been inverted by an inverter 21 are alternately changed over and selected for each field by means of the head switching signal SW30 corresponding to the rotation of the rotating head 3. This makes it possible to obtain correct information E (information indicating the magnitude of reproducing pilot signals from the adjacent tracks) in the direction of a tracking error even if the track being scanned is any of the tracks $f_1$ to $f_4$.

Figure 3:
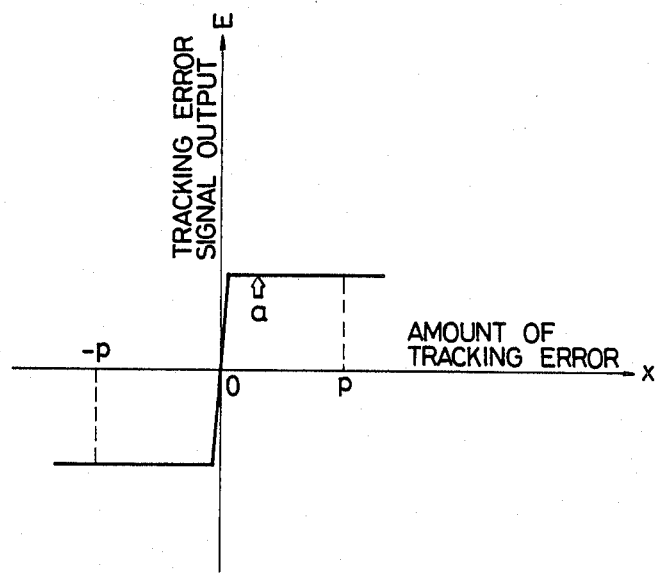
FIG. 3 is a graph illustrating detection characteristics of error signals.
Figure 4B:
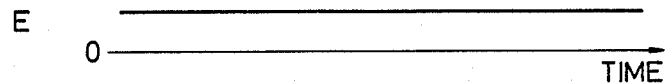

FIG. 3 shows a relationship between the amount of a tracking error 'x' obtained in this embodiment and the tracking signal error output E at that time. For instance, in the head tracing condition shown in FIG. 2 (in which the head deviates slightly to the upper right), the tracking error signal output E is "H", as shown by the arrow 'a' in FIG. 3. If this condition is shown by waveform diagrams shown in FIGS. 4a to 4d which illustrate the conditions of the respective portions, the tracking error signal output E remains in the state of "H", as shown in FIG. 4b.

Figure 4C:
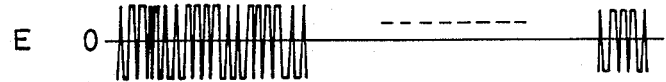

When the video head accurately traces the recorded track, the tracking error signal output E becomes a pulse width modulation (PWM) signal which repeats "H" and "L", as shown in FIG. 4c, and the mean voltage becomes substantially zero. In addition, the duty ratio of the PWM signal varies in response to any slight tracking error.

Figure 4D:
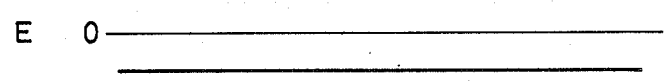

Meanwhile, in a state in which the head tracing deviates slightly to the lower left contrary to the head tracing condition shown in FIG. 2, the tracking error signal output E remains in the "L" state, as shown in FIG. 4d.

The tracking error signal output E having such characteristics shown in FIG. 3 is smoothed by a low-pass filter (hereafter referred to as the "LPF") 23 and is applied to an adder 9. In addition, a speed error signal 'v' obtained via a frequency discriminator 8 from a signal having a frequency proportional to the number of revolutions of the capstan motor 6, which is obtained from a frequency generator 7 generating the signal of a frequency corresponding to the number of revolutions, is applied to the adder 9 so as to be added to the smoothed tracking error signal. The signal added by the adder 9 is supplied to the capstan motor 6 via a capstan driver 10, and an automatic tracking operation is effected by controlling the capstan motor 6 in such a manner that the video head will accurately trace the recorded track.

As described above, the error signal detection characteristics in the present invention produces various advantages, as described below, in comparison with a conventional system, since the gain in the vicinity of the tracking center ($x=0$) is extremely large, as shown in FIG. 3.

Figure 5:
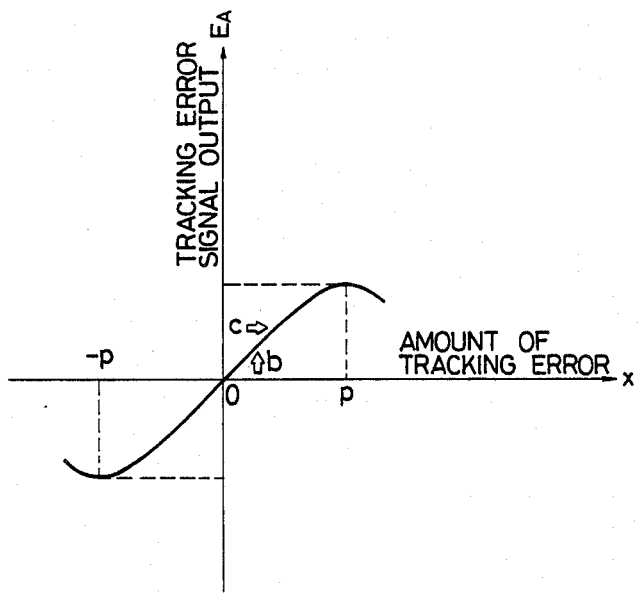
FIG. 5 is a graph illustrating the detection characteristics of error signals employed in conventional pilot-system tracking control.

FIG. 5 is a graph illustrating error signal detection characteristics, similar to those shown in FIG. 3, in the case of a conventional system. The drawing shows error signal detection characteristics obtained in cases where a differential amplifier for outputting a difference between the $f_H$ error signal and the 3 $f_H$ signal is employed instead of the comparator 20 in the block diagram of FIG. 1.

In this case, in the head tracing condition shown in FIG. 2 (in which the head tracing deviates slightly to the upper right), a given positive voltage appears as a tracking error signal $E_A$ in this case, as shown by the arrow b in FIG. 5. In the conventional system, tracking control is effected by feeding back to the capstan motor 6 this differential signal $E_A$ which appears in response to a tracking error. However, if the initial setting of the speed is offset owing to the temperature drift and the like of a circuit constant (the initial setting is made such that a standard reproducing speed is established when E or $E_A$ is zero), it is necessary to apply the tracking error signal $E_a$, which is a phase system, in the direction of the arrow C shown in FIG. 5 in order to cancel the same. Consequently, an amount of a tracking error shown by the arrow C results (of course, if the initial setting is correct, $E_A$ is zero when the video head accurately traces the recorded track, and the amount of the tracking error is also zero).

In contrast, in the present invention, even if the initial setting of the speed is similarly offset, and a voltage for cancelling the same is supplied through the tracking error signal E, the amount of the tracking error can be reduced substantially to zero since the gain is very large, as shown in FIG. 3.

As a second advantage, it can be pointed out that the loop gain of the servo system is not substantially varied by the reproduction level of reproducing pilot signals. In the conventional system, as shown in FIG. 5, in cases where the tape, the head, and so forth differ, and where the width of the reproducing track becomes different as a result of a change in the reproduction mode (in LP mode, the track width becomes one half of that of SP mode), the detection sensitivity (the curved inclination in FIG. 5) varies in response to the same, so that the loop gain of the servo system varies substantially, with the result that there arises a problem in that the stability of the system deteriorates.

In contrast, in the present invention, since not the amplitude of the differential output of the error signals in the adjacent tracks but the information solely on the relationship in the magnitude of the two signals concerned is used, the detection characteristics shown in FIG. 3 are not subject to any change in the absolute values of the reproducing output, and do not change even if the reproduction output undergoes a change. Accordingly, it is possible to maintain the loop gain of the servo system at a constant level.

As a second embodiment, description will now be made of an example in which the capstan motor is switched over and driven by the tracking error signal of the PWM signal, by making use of the fact that the output E from the comparator 20 which compares the magnitude of reproducing pilot signals from the adjacent tracks.

Figure 6:
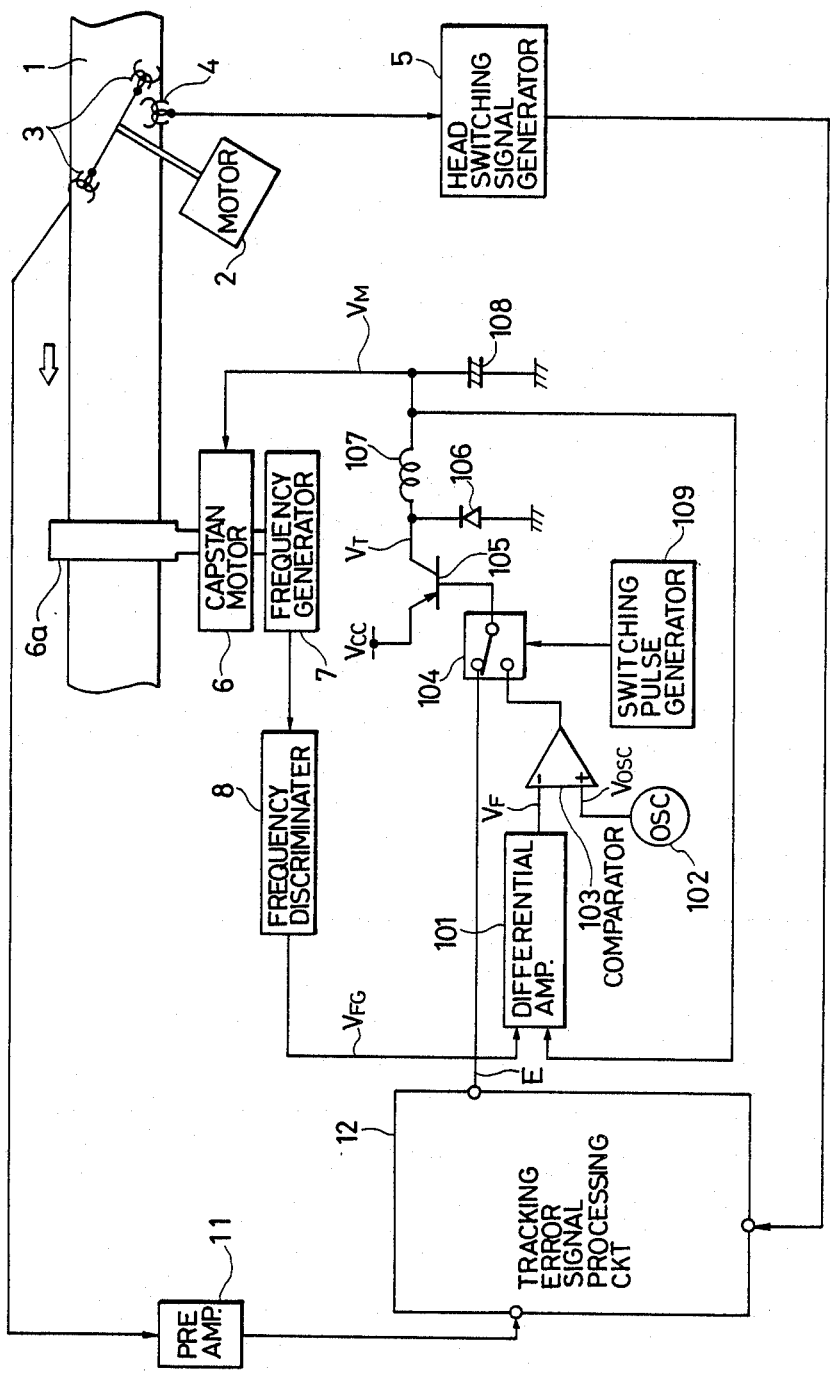
FIG. 6 is a block diagram illustrating another embodiment of the present invention; m

FIG. 6 illustrates a block diagram in the case of this switching drive, in which components having the same functions as those shown in FIG. 1 are indicated by the same reference numerals. In this embodiment, the driver of the capstan motor is constituted by a switching power source comprising a switching transistor 105, a flywheel diode 106, a coil 107, and a smoothing capacitor 108.

Referring first to waveform diagrams shown in FIGS. 7a to 7c, description will be made of a state in which a switch 104 is constantly connected to a comparator 103, i.e., of the operation of speed control alone. At this time, a supply voltage $V_{cc}$ is applied to the emitter of the transistor 105, and description will be made by assuming that a voltage $V_T$ of the collector of the transistor 105 is $V_{To}$ and that a voltage (the output of the coil 107) $V_M$ applied to the capstan motor 6 is $V_{Mo}$. To describe the operation using an example of specific numerals, it is assumed that the 100 rpm rotation is obtained at 2 V, and that the standard traveling of the tape 1 is effected in that state. It is assumed that the frequency discriminator 8 outputs $V_{FG}=V_{Mo}$ at 100 rpm.

In this case, when the capstan motor is rotating at 100 rpm, both $V_{FG}$ and $V_M$ are $V_{Mo}$, and the differential output $V_F$ thereof is zero. Accordingly, as shown in FIGS. 7a to 7c (the drawings show a case where $V_F$ shows a slightly positive value), the transistor 105 is switched over by a comparison output of the comparator comparing the output $V_F$ of the differential amplifier 101 with the output $V_{osc}$ of a saw-tooth oscillator 102, and the collector voltage $V_{To}$ becomes a voltage of the PWM waveform having a duty ratio of 50%. Accordingly, the output voltage is smoothed by the coil 107 and the capacitor 108 (here, a diode 106 is used to allow a current to flow continuously to the coil 107 when the transistor 105 is off), and a DC voltage of $V_{Mo}$ is applied to the motor 6, with the result that the capstan motor 6 continues its standard rotation.

Then, for example, when the rotation of the capstan motor 6 is accelerated, $V_{FG}$ rises, and $V_F$ becomes a slightly positive value, as shown in FIG. 7c. Consequently, as shown in FIG. 7b, the duty ratio drops below 50% to cause $V_{Mo}$ to decline, and control for delaying the rotation of the capstan motor 6 is thereby effected, so that a constant rotational speed is automatically maintained.

The repeated frequency of saw-tooth waves generated by the sam-tooth oscillator 102 is determined by requirements of such as the time constant of the circuit constituting the servo system and the response speed of the servo, and can be selected from a wide range of frequencies in the vicinity of several hundred Hz to 10 kHz.

If control using a tracking error signal, which constitutes a phase control loop, is added to the speed control loop operating as described above, a system has conventionally been carried out in which a DC voltage signal passing through a differential amplifier for generating a tracking error signal is analog added to the output $V_{FG}$ of a frequency discriminator corresponding to the number of revolutions.

In contrast, in the present embodiment, the error signal of the speed control loop and the tracking error signal, which constitutes a phase control loop, are added on a time-sharing basis, as shown in FIGS. 8a to 8d, by switching over the switch 104 alternately by means of the output signal of a switching pulse generator 109.

In other words, FIG. 8a shows a tracking error signal in the state of the PWM signal output from the tracking error signal processing circuit 12; FIG. 8b shows an error signal in the state of the PWM signal of the speed control loop output from the comparator 103; FIG. 8c shows an output signal of the switching pulse generator 109; and FIG. 8d shows the output signal of the switch 104.

Thus, in the present embodiment, the tracking error signal E in the state of the PWM signal, which is a digital output of the comparator, is directly switched over and driven via the switch 104. Accordingly, a means for smoothing the tracking error signal E and adding the same can be omitted in comparison with the conventional system.

In addition, it is apparent that the ratio of addition between the error signal of the speed control loop and the error signal of the phase control loop can be varied, as desired.

In other words, the motor voltage $V_M$ can be controlled by varying the ratio of mixing of the PWM signal $V_{Ro}$ obtained in the speed control and the digital PWM signal E.

Figure 9:
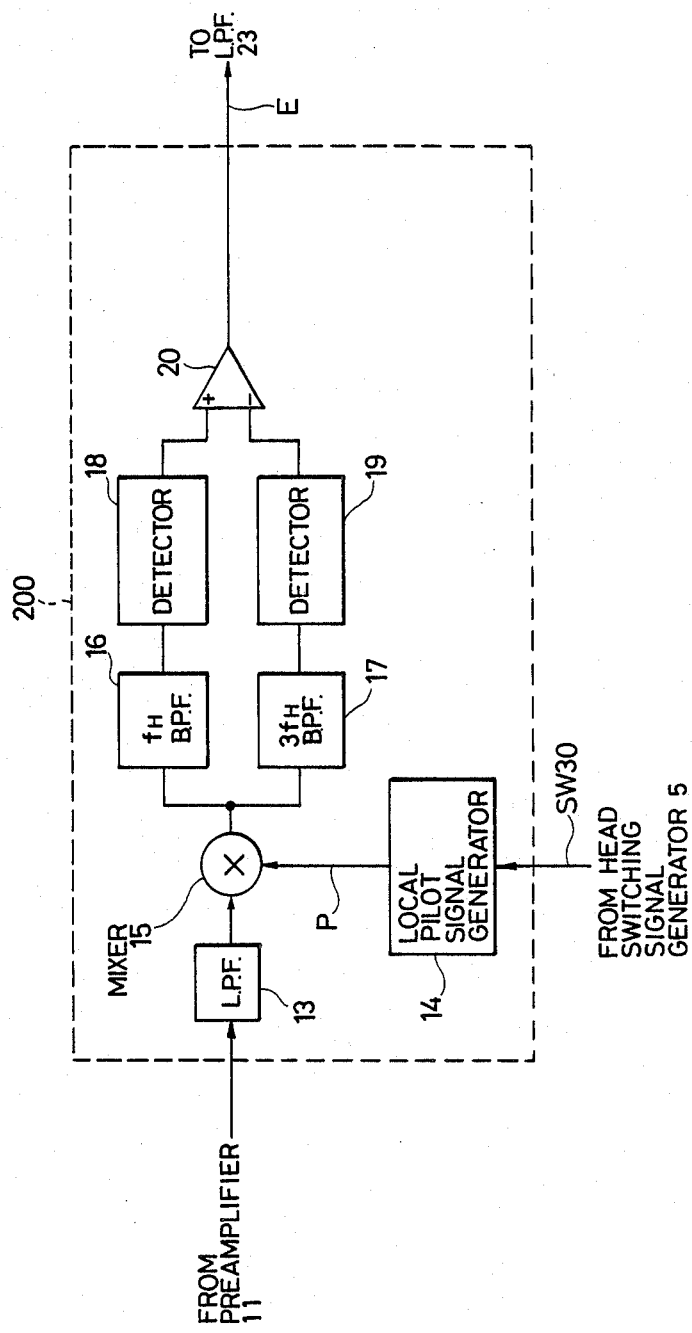
FIG. 9 is a block diagram illustrating some circuits of still another embodiment of the present invention.

Referring now to FIG. 9, description of a third embodiment will be made. The tracking error signal processing circuit 12 in FIG. 1 is arranged such that the output of the comparator 20 and a signal with its phase inverted by the inverter 21 are alternately switched over by 1 changeover switch 22 for each field by means of a head switching signal. However, in the present embodiment, the output per se of the comparator 20 is used as the tracking eror signal E in the manner similar to that of FIG. 1 by converting the procedure for generating local pilot signals output from the local pilot signal generator 14 into the reverse rotation such as $f_4, f_3, f_2, f_1$, ... as in the case of a tracking error signal processing circuit 200 shown in FIG. 9 (the same reference numerals are used for the same components as those shown in FIG. 1).

According to this third embodiment, as compared with the first embodiment, a simpler arrangement can be made by omission of the phase inverter and the changeover switch 22 in FIG. 1.

What is claimed is:

1. A tracking controlling device for a helical scanning-type video signal magnetic recordig and reproducing apparatus, in which pilot signals constituted by a plurality of signals whose frequencies are changed over for each track are recorded in advance on video signal tracks on said magnetic tape such as to be superimposed on video signals, and said recorded pilot signals are reproduced during a reproducing operation so as to be used for effecting tracking control, said tracking controlling device comprising:

detecting means for respectively separating and detecting pilot signals simultaneously picked up from the tracks adjacent to the track to be reproduced, from the signals reproduced by tracing by a rotating head;

comparing means for comparing the magnitude of the two signals detected by said detecting means and for outputting the signal of either one of the binary levels in corresponding with the magnitude thereof; and controlling means for controlling the tracking by said rotating head in relation to a recording track by controlling the travelling phase of a magnetic tape by making use of the output signal of said comparing means;

wherein said controlling means for controlling said traveling phase of said magnetic tape and said tracking has means for detecting the rotational speed of said capstan motor for running said magnetic tape and generating a PWM signal corresponding to said rotational speed, driving means for driving said capstan motor constituted by a power source which is controlled by switching, and switching means for time sharing said PWM signal corresponding to said rotational speed and a tracking error signal output by said comparing means at a preset cycle so as to be switched over and applied to said driving means.

2. A tracking controlling device according to claim 1, wherein said generating means for generating said PWM signal corresponding to said rotational speed of said capstan motor has means for outputting a signal of a magnitude corresponding to an error of said rotational speed of said capstan motor, means for generating a saw-tooth signal of a predetermined cycle, and comparing means for comparing said speed error signal of said capstan motor with said saw-tooth signal.

3. A tracking controlling device according to claim 1, wherein said means for detecting said pilot signals includes means for generating a local pilot signal set with the same frequency as that of a pilot signal to be recorded and means for effecting frequency conversion of a reproduced pilot signal using said local pilot signal.

4. A tracking controlling device according to claim 3, wherein said local pilot signal generating means is arranged such that local pilot signals are generated in the reverse rotation of the frequencies of said pilot signals recorded on said magnetic tape.

5. A tracking controlling device for a helical scanning-type video signal magnetic recording and reproducing apparatus, in which pilot signals constituted by a plurality of signals whose frequencies are changed over for each track are recorded in advance on video signal tracks on said magnetic tape such as to be superimposed on video signals, and said recorded pilot signals are reproduced during a reproducing operation so as to be used for effecting tracking control, said tracking controlling device comprising:

detecting means for respectively separating and detecting pilot signals simultaneously picked up from the tracks adjacent to the track to be reproduced, from the signals reproduced by tracing by a rotating head;

comparing means for comparing the magnitude of the two signals detected by said detecting means and for outputting the signal of either one of the binary levels in correspondence with the magnitude thereof; and controlling means for controlling tracking by said rotating head in relation to a recording track by controlling the travelling phase of a magnetic tape by making use of the output signal of said comparing means;

wherein said controlling means for controlling said traveling phase of said magnetic tape and said tracking includes speed controlling loops for rotating said capstan motor at a constant speed by detecting the rotational speed of said capstan motor for running said magnetic tape and by feeding back the output of detection to driving means of said capstan motor and supplying means for supplying a tracking error signal output by said comparing means to said driving means for driving said capstan motor, said speed controlling loops having a frequency generator for generating a signal of a frequency corresponding to the rotational speed of said capstan motor, a frequency discriminator to which the output of said frequency generator is supplied, and a driving circuit to which the output of said frequency discriminator is supplied and which is adapted to drive said capstan motor, said supplying means for supplying said tracking error signal to said driving means for driving said capstan motor having a low-pass filter for smoothing said tracking error signal output by said comparing means, and an adder circuit for adding the output of said low-pass filter and the output of said frequency discriminator.

6. A tracking controlling device according to claim 5, wherein said means for detecting said pilot signals includes means for generating a local pilot signal set with the same frequency as that of a pilot signal to be recorded and means for effecting frequency conversion of a reproduced pilot signal using said local pilot signal.

7. A tracking controlling device according to claim 6, wherein said local pilot signal generating means is arranged such that local pilot signals are generated in the reverse rotation of the frequencies of said pilot signals recorded on said magnetic tape.

* * * * *